W. P. PENN.
Grain Drill.
No. 26,612.
Patented Dec. 27, 1859.
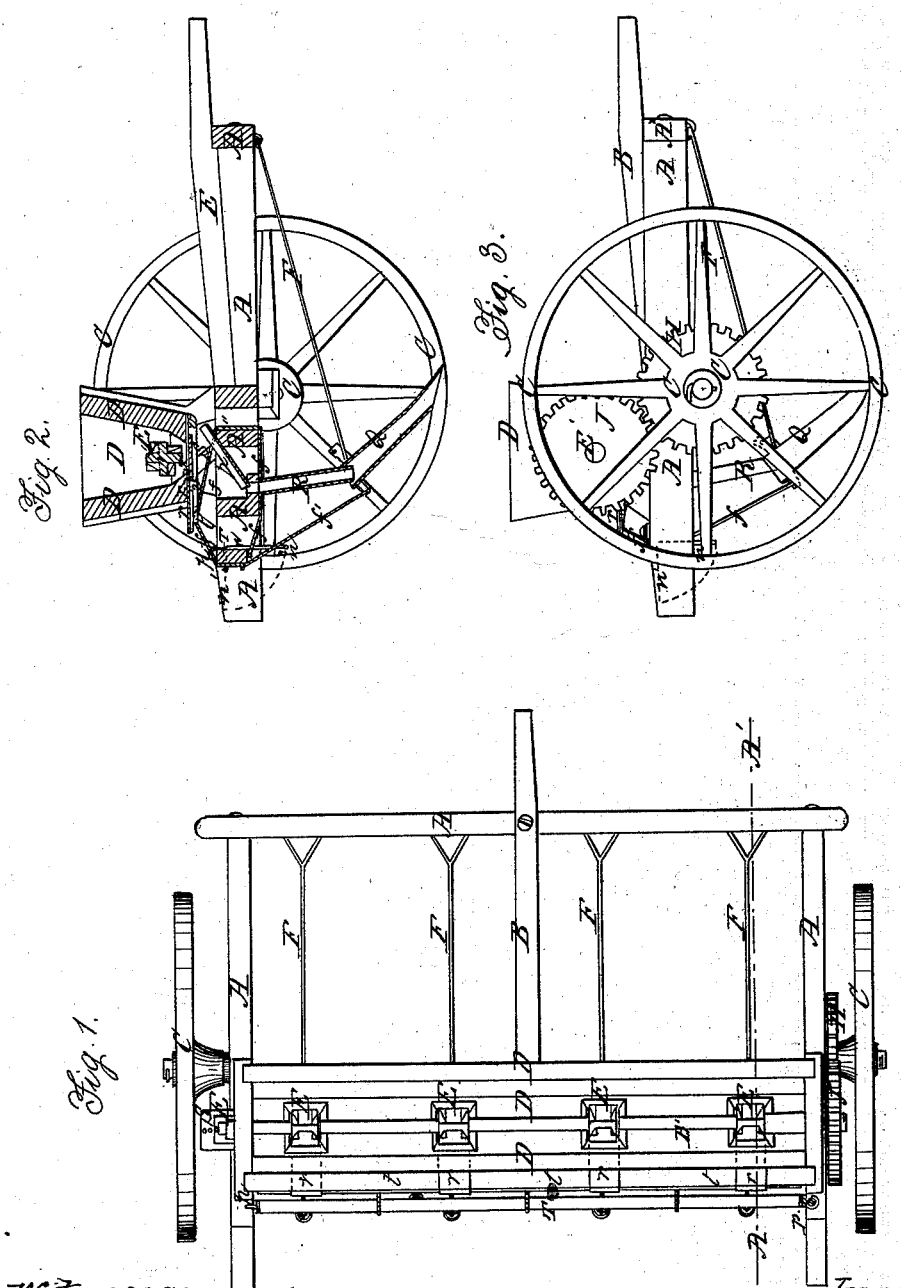

UNITED STATES PATENT OFFICE.

WORDEN P. PENN, OF BELLEVILLE, ILLINOIS.

IMPROVEMENT IN SEED-DRILLS.

Specification forming part of Letters Patent No. 26,612, dated December 27, 1859.

*To all whom it may concern:*

Be it known that I, WORDEN P. PENN, of Belleville, in the county of St. Clair and State of Illinois, have invented a new and useful Improvement in Seed-Drills; and I do hereby declare that the following is a full, clear, and exact description of the same, reference being had to the annexed drawings, making part of this specification, in which—

Figure 1 is a plan; Fig. 2, a side elevation, and Fig. 3 a transverse section through A' A.

To enable others skilled in the arts to which my invention appertains to make and use the same, I will proceed to describe the construction and operation thereof.

Similar letters of reference represent corresponding parts of the different figures of the drawings annexed.

Upon the drawings, A represents the frame of the machine, and C the truck-wheels, the axles of which are bolted to the frame of the machine. Across the frame a hopper-box, D, is fixed in the manner shown, and in the bottom of the said box a series of angular holes are cut, as shown at $x$, Fig. 2, into which a series of angular wheels, E, are made to work, which are fixed upon the shaft E' in the bottom of the box aforesaid. This shaft E receives a rotating motion through the agency of a cog-wheel, J, fixed upon one of its ends, and which meshes into a corresponding wheel, H, fixed to the hub of the wheel C, from whence it receives its motion. To the under side of the hopper-box a bracket, $v$, is fixed, or rather a number of brackets, made of the form shown, so as to receive the valve $s$, which has holes $u$ in it, and which may be moved longitudinally along the under side of the box, the holes $u$ being made to correspond with the holes $x$ in the box, only smaller. The brackets $v$ are also made to receive the bar $t$, to which valves $r$ are fixed (equal in number to the holes in the bottom of the box) and so arranged as to work over the valve $s$ and under the bottom of the box D. To the bar $t$ chains $f$ are fixed, which are also attached to the bar T, and which passes around the two frame-pieces A" A" in the manner shown, and to the bar T there are also a number of chains, $f'$, one for each of the hoes or flukes Q, to which the said chains are also attached in the manner shown. Now, the bar T, being fixed upon centers P in the frame, so as to have an eccentric motion around the said centers, will (when operated upon by the lever $n$) raise the flukes Q from the ground and close the valves $r$ simultaneously, the chain $f$ being fixed to the bottom side of the bar T when in the position shown. The flukes Q, when raised as aforesaid, slip over the tubes R, which are in communication with the leader $h$, which receives the seed from the hopper-box, from whence it falls to the ground through the tubes R and flukes Q, these latter being supported by the drag-bars or braces F in the ordinary manner. Thus much for the construction.

The operation is as follows: The seed, being first put into the hopper-box, is fed by the wheels E through the holes $x$, from whence it is conveyed to the ground through the agency of the leader $h$, tube R, and fluke Q. The flow of seed through the hopper is regulated by the valve $s$, which may be so adjusted as to allow more or less seed to pass through, as the case may require, the said valve being secured at any given position by means of a pin, which is passed through the bracket K (fixed against one end of the hopper) into the end of the valve, which is made to project beyond one end of the hopper, as shown at Fig. 1 at $s$. The flow of grain through the machine is stopped by the valves $r$ whenever the flukes are raised from the ground, as the same power and motion which raises the flukes off of the ground also closes the valves by means of the arrangement of chains with the valve-bar $t$, eccentric bar T and the valves with the hopper-box, all being combined as described, so as to effect the object sought after—viz., shut off the flow of seed at the same time the flukes are raised off of the ground—with the described arrangement and combination of valves.

I am aware that the valves of the hopper-box have been closed simultaneously with the raising of the flukes off of the ground. This, therefore, I do not claim as such; but

What I claim is—

The arrangement of endless chain $f$ with the eccentric bar T and valve-bar $t$, with the valves $x$ thereto attached, for the purpose of closing and opening the said valves and raising the flukes simultaneously, in the manner described.

W. P. PENN.

Witnesses:
 C. E. GRAY,
 AMOS BROADNAX.